(12) United States Patent
Kachoosangi

(10) Patent No.: US 9,562,565 B2
(45) Date of Patent: Feb. 7, 2017

(54) SLIDING BEARING

(71) Applicants: Mahle International GmbH, Stuttgart (DE); Mahle Engine Systems US Limited, Northampton (GB)

(72) Inventor: Roohollah Kachoosangi, Oxfordshire (GB)

(73) Assignees: Mahle International GmbH (DE); Mahle Engine Systems UK Limited (GB)

( * ) Notice: Subject to any disclaimer, the term of this patent is extended or adjusted under 35 U.S.C. 154(b) by 24 days.

(21) Appl. No.: 14/400,250

(22) PCT Filed: May 9, 2013

(86) PCT No.: PCT/GB2013/051204
§ 371 (c)(1),
(2) Date: Nov. 10, 2014

(87) PCT Pub. No.: WO2013/167900
PCT Pub. Date: Nov. 14, 2013

(65) Prior Publication Data
US 2015/0125101 A1    May 7, 2015

(30) Foreign Application Priority Data
May 11, 2012 (GB) .................................. 1208266.5

(51) Int. Cl.
*F16C 33/04* (2006.01)
*F16C 33/20* (2006.01)
*F16C 33/12* (2006.01)

(52) U.S. Cl.
CPC ........... *F16C 33/201* (2013.01); *F16C 33/043* (2013.01); *F16C 33/046* (2013.01); *F16C 33/124* (2013.01); *F16C 33/125* (2013.01); *F16C 33/208* (2013.01)

(58) Field of Classification Search
CPC ................ F16C 33/20–33/208; F16C 33/043; F16C 33/046; F16C 2206/06
See application file for complete search history.

(56) References Cited

U.S. PATENT DOCUMENTS

| | | | | |
|---|---|---|---|---|
| 8,314,053 B2* | 11/2012 | Jensen | ................... | F16C 33/043 508/100 |
| 2012/0184471 A1* | 7/2012 | Windrich | ................. | C09D 5/00 508/113 |
| 2012/0201487 A1* | 8/2012 | Kverel | ................. | C10M 103/00 384/463 |

FOREIGN PATENT DOCUMENTS

| | | |
|---|---|---|
| AT | 505 226 A1 | 11/2008 |
| DE | 102006003906 A1 | 8/2007 |
| DE | 102008030716 A1 | 12/2009 |
| DE | 102010035528 A1 | 3/2012 |
| JP | H11-080767 | 3/1999 |

(Continued)

OTHER PUBLICATIONS

GB Search Report for GB1208266.5, dated Aug. 9, 2012.
(Continued)

*Primary Examiner* — Alan B Waits
(74) *Attorney, Agent, or Firm* — Fishman Stewart PLLC

(57) ABSTRACT

A sliding bearing for an internal combustion engine having a plastics polymer-based composite layer on a substrate, the composite layer comprising: a matrix of plastics polymer-based material having distributed throughout the matrix; 0.1 to 5% vol carbon nanostructures; and incidental impurities; and a method of manufacture of such a sliding bearing.

24 Claims, 2 Drawing Sheets

(56) References Cited

FOREIGN PATENT DOCUMENTS

| | | |
|---|---|---|
| JP | 2010-270203 A | 12/2010 |
| WO | WO-2004/113749 A1 | 12/2004 |
| WO | WO-2010/066396 A1 | 6/2010 |
| WO | WO-2011/039095 A1 | 4/2011 |

OTHER PUBLICATIONS

International Search Report for PCT/GB2013/051204, mailed Jan. 20, 2014.
English abstract for DE-102008030716.
English abstract for JP11080767.
English abstract to for JP-2010-270203.
English abstract for DE-102006003906.
English abstract for DE-102010035528.

* cited by examiner

SLIDING BEARING

This application claims priority to Great Britain Patent Application No. 1208266.5, filed May 11, 2012, and International Patent Application No. PCT/GB2013/051204, filed May 9, 2013, both of which are hereby incorporated by reference in their entirety.

TECHNICAL FIELD

The present invention relates to sliding bearings for internal combustion engines having a polymer-based bearing material layer, and in particular to sliding bearings such as bearing lining shells, bushes, bearing surfaces of connecting rods, thrust washers, and bearing surfaces of engine housings and engine blocks.

BACKGROUND

Sliding bearings are used in internal combustion engines, for example as bearing lining shells and thrust flanges. Bearing lining shells for use as crankshaft journal bearings in internal combustion engines, are typically semi-cylindrical in form. Bearing lining shells are provided with one or more generally semi-annular thrust flanges (e.g. at each axial end of the bearing shell) before being assembled into the bearing of an engine.

The bearing surfaces of sliding bearings generally have a layered construction. The layered construction frequently comprises a strong backing material, such as steel, of a thickness in the region of about 1 mm or more; a layer of a first bearing material (the "lining layer"), such as a copper-based material (e.g. bronze) or aluminium-based material, is adhered to the backing, and of a thickness generally in the range from about 0.1 to 0.5 mm (e.g. 300 μm of copper-based alloy of 8% wt Sn, 1% wt Ni, and balance of Cu, apart from incidentally impurities); and a layer of a second bearing material (the "overlay layer") of a metallic or polymer-based bearing material adhered to the surface of the lining layer and having a thickness of less than about 25 μm.

The surface of the second layer forms the actual running or sliding surface, which, in use, faces the surface of a co-operating shaft journal. The backing provides strength and resistance to deformation of the bearing shell when it is assembled in a main bearing housing or in a connecting rod big end, for example. The first layer may provide suitable bearing running properties, if the second layer should be worn through for any reason. As noted above, whilst the first bearing material provides seizure resistance and compatibility, it is generally harder than the material of the second layer. Thus, the first layer is commonly inferior to the second layer in terms of its ability to accommodate small misalignments between the bearing surface and the shaft journal (conformability) and in the ability to embed dirt particles circulating in the lubricating oil supply, so as to prevent scoring or damage to the journal surface by the debris (dirt embedability).

The first bearing material is commonly chosen from either an aluminium-based alloy (i.e. having no more than 25% wt additive elements, with the balance to 100% wt of aluminium) or a copper-based alloy material (i.e. having no more than 20% wt additive elements, with the balance to 100% wt of copper). Aluminium-based alloys generally comprise an aluminium alloy matrix having a second phase of a soft metal therein. Generally, the soft metal phase may be chosen from one or more of lead, tin and bismuth, however, lead is nowadays a non-preferred element due to its environmental disadvantages. Copper-based alloys such as copper-lead and leaded bronzes are also likely to fall into disfavour eventually due to these environmental considerations and may be replaced by lead-free copper alloys, for example.

The second bearing material layer, which forms a mating fit with the shaft journal with a clearance for lubricating fluid, is also known as an overlay layer and is formed of a matrix of plastics polymer material with filler, which for example has a thickness of 4 to 40 μm.

WO2004/1 13749 of common ownership herewith describes a plastics polymer-based bearing layer having a preferred conventional overlay layer thickness of 10 to 30 μm, when deposited upon a bearing having a layer of metallic bearing material, and which overlay is intended to last the life of the bearing. Moreover, the plastics polymer-based bearing material described in the document is also able to constitute a sole bearing layer when deposited directly upon a strong backing layer at a preferred thickness range of 40-70 μm. The plastics polymer-based overlay material comprises: a matrix of a polyimide/amide or modified epoxy resin and fillers selected from: 15-30% vol metal powder; 1-15% vol fluoropolymer; 0.5-20% vol ceramic powder; and 2-15% vol silica. Plastics polymer overlay layers based on such formulations exhibited high wear resistance and fatigue strength. However, the relatively high levels of filler content tended to make the overlay layer relatively hard and consequently less able to absorb and nullify the deleterious effects of debris particles circulating in the lubricating oil, such that the dirt embedability may be less than desired, which can lead to scoring of the bearing surface and/or the shaft journal surface. Accordingly, WO 2004/1 13749 also discloses that the polyimide/amide resin matrix also contains additions of vinyl resin to improve the conformability of the resulting bearing layer. However, the vinyl additions tend to weaken the polyimide/amide matrix in terms of strength.

WO2010/066396 of common ownership herewith describes a plastics polymer-based bearing layer comprising a matrix of a polyimide/amide plastics polymer material and having distributed throughout the matrix: from 5 to less than 15% vol of a metal powder; from 1 to 15% vol of a fluoropolymer, the balance being the polyimide/amide resin apart from incidental impurities (e.g. a layer of 12 μm thickness that comprises 12.5% vol Al, 5.7% vol PTFE particulate, 4.8% vol silane, <0.1% vol other components, and balance (approximately 77% vol) polyimide/amide). This provides a significantly higher proportion of an inherently stronger material than the plastics polymer-based bearing material of WO2004/1 13749. However, it remains desirable to further increase wear resistance and to further improve the fatigue strength of layers in bearing linings, particularly overlay layers.

A particular challenge to the performance of bearing lining layers and/or overlay layers is provided by the fuel-saving configuration of vehicle engines to "stop-start" operation, in which the engine is stopped and requires restarting each time the vehicle stops, in contrast to conventional engine operation, in which the engine is kept running throughout a vehicle's journey. Engines configured for stop-start operation may restart their engines about one hundred times more frequently than conventionally configured engines run continuously throughout each vehicle journey. Engine bearings are conventionally hydrodynamically lubricated, with little or no lubrication initially being provided to the bearings when the engine starts. Accordingly, stop-start operating of an engine can place increased demands upon the performance of the bearings.

It is also known to provide a plastics polymer-based bearing layer on top of a conventional metallic bearing alloy lining layer (e.g. with or without an intervening metallic overlay layer), as a so-called "bedding-in" layer that is intended to wear away as a sacrificial layer, leaving the conventional metallic bearing lining layer beneath as the running or sliding surface in the longer term. Such polymer bedding-in layers typically have relatively high contents of filler materials, generally comprising self-lubricating materials such as graphite, molybdenum disulphide and the like. As remarked above, high filler contents of inherently weak materials are detrimental to strength and wear resistance of the bearing layer, which consequently wears away relatively rapidly to fulfil the function of a bedding-in layer. Since the layer is intended to wear away relatively rapidly, it is generally relatively thin.

SUMMARY

According to a first aspect of the present invention there is provided a sliding bearing for an internal combustion engine having a plastics polymer-based composite layer on a substrate, the composite layer comprising:
 a matrix of plastics polymer-based material having distributed throughout the matrix;
 0.1 to 5% vol carbon nanostructures; and
 incidental impurities.

According to a second aspect of the present invention there is provided a flat sheet element for forming a sliding bearing for an internal combustion engine having a plastics polymer-based composite layer on a substrate, the composite layer comprising:
 a matrix of plastics polymer-based material having distributed throughout the matrix;
 0.1 to 5% vol carbon nanostructures; and
 incidental impurities.

According to a third aspect of the present invention there is provided a method of manufacturing a sliding bearing for an internal combustion engine having a plastics polymer-based composite layer on a substrate, the composite layer comprising:
 a matrix of plastics polymer-based material having distributed throughout the matrix;
 0.1 to 5% vol carbon nanostructures; and
 incidental impurities,
the method comprising the steps of:
 making a mixture comprising a plastics polymer-based resin material and carbon nanostructures;
 coating the mixture onto a substrate; and,
 treating so as to consolidate the plastics polymer-based material matrix to form a composite layer.

Carbon nanostructures (i.e. carbon structures having at least one dimension that is sub-micron, and preferably less than 100 nm, in size) describes members selected from the group consisting of carbon nanotubes, carbon nano-spheres, carbon nano-ellipsoids, functionalised carbon nanotubes, functionalised carbon nano-spheres and functionalised carbon nano-ellipsoids (i.e. carbon nanotubes and like structures, which may be functionalised).

The carbon nanostructures may comprise carbon nanotubes.

The carbon nanotubes may be incorporated into the composite layer in a randomly aligned arrangement.

The carbon nanotubes may be incorporated into the composite layer in a highly aligned arrangement, with the length of the nanotubes substantially parallel to the interface between the composite layer and the substrate.

The carbon nanotubes may be incorporated into the composite overlay layer in a partially aligned arrangement, being partially aligned with an interface between the composite layer and the substrate.

The nanotubes may be 0.5 to 50 nm in diameter. The nanotubes may be 1 to 40 μm long. The nanotubes may be at least 100 times longer than their diameter, and optionally at least 1000 times longer than their diameter.

The carbon nanostructures may comprise ball-shaped carbon nanostructures.

The carbon nanostructures may comprise ellipsoidal carbon nanostructures.

The carbon nanostructures may be functionalised carbon nanostructures.

The composite layer may comprise 0.1 to 5% vol carbon nanostructures, and preferably 0.5 to 3% vol carbon nanostructures.

A carbon nanostructure is any carbon allotrope composed entirely of carbon, in the form of a hollow sphere, ellipsoid, or tube having a sub-micron diameter. Advantageously, the incorporation of carbon nanostructures into the polymer-based matrix increases the strength, hardness and wear resistance of the composite overlay layer, whilst still permitting good embedability of any particulate carried in the oil that lubricates the bearing. The exposed carbon nanostructures also increase the lubricious properties of the free surface, reducing friction of the polymer-based matrix when the journaled shaft contacts the bearing overlay layer, for example when the engine starts and before the lubrication oil has risen to full pressure.

Advantageously, the carbon nanostructures have high strength and reinforce the polymer-based matrix. Further, in the case of carbon nanotubes, due to the carbon nanotubes being much longer than their diameter (e.g. having a length that is hundreds or thousands of times longer than the diameter of the tube), when provided in sufficient concentration and evenly distributed, the nanotubes in the composite layer may become entangled about each other, further reinforcing the polymer-based matrix. Additionally, in the case of carbon nanotubes, they may enhance thermal dissipation through the layer, e.g. away from the free surface of an overlay layer.

The exposure of the carbon nanostructures at the free surface of the bearing overlay layer may also lead to enhanced trapping of oil molecules, improving the lubrication of such a bearing.

Other types of carbon nanostructures may alternatively or additionally be incorporated into the polymer-based matrix, such as hollow spheres (e.g. $C_{52}$, $C_{60}$, $C_{70}$, $C_{76}$, $C_{84}$, etc.) or ellipsoids.

The carbon nanostructure may be a functionalised carbon nanostructure, such as a functionalised single wall nanotube (SWNT) or multi-wall nanotube (MWNT). For example the carbon nanostructure may be functionalised with an acid side chain, acyl side chain, amine/amide side chain, a fluorinated side chain or an oxidised side chain. Some examples of such structures are single wall nanotubes (SWNT) functionalised with an acid-terminated group (e.g. SWNT-(CH2CH2COOH)x), an acyl chloride terminated group (e.g. SWNT-(CH2CH2COCl)x) or an amine-amide terminated group (e.g. SWNT-(CH2CH2CONHCH2CH2NH2)x). In the case of nanotubes, the functionalisation may be sidewall or end-cap functionalised.

Such functionalisation may improve the ability of the carbon nanostructure to stay in suspension within the liquid polymer in solution and/or may enhance oil trapping performance on the exposed surface of a bearing.

The plastics polymer material may be selected from the group consisting of a polyimide/amide resin, acrylate resin, epoxy resin, fluoropolymer and formaldehyde. Plastics polymers from this group aim to provide one or more of the following properties:

bond well to metallic surfaces (e.g. may bond to the substrate without the need for an adhesion promoting interlayer, or roughening the surface of the substrate);

have at least some flexibility, providing a low risk of cracking and/or delamination of the composite layer;

resistant to chemical degradation (e.g. acid hydrolysis and oxidation, through exposure to mineral acids and chlorine in engine lubricant, and exposure to high temperatures); and suitable for deposition in solution, enabling their deposition by spraying and printing.

Polyimide/amide resin provides a particularly preferred balance of these properties.

Desirably the solvent mixture is of a suitable viscosity that the coating technique of applying the solvent mixture to the substrate results in the final thickness of the plastics polymer bearing material being formed without the need to machine to a desired final wall, thickness. However, machining of the plastic polymer material may be undertaken, if required.

The composite layer may comprise at least 60% vol of plastics polymer-based material.

The plastics polymer mixture may also contain an addition of a silane material. Silane materials have been found to promote stability of the polyimide/amide matrix and have also been found to promote adhesion of the polyimide/amide resin material to the substrate. A suitable silane material may be a gamma-aminopropyltriethoxysilane (e.g. 3-aminopropyltriethoxysilane), and an addition in the range of 3 to 6% vol may be made to the mixture.

A suitable alternative silane material may comprise bis-(gamma-trimethoxysilpropyl)amine.

The mixture of plastics polymer-based resin material and carbon nanostructures may further comprise solvent, which may facilitate forming the mixture. A suitable solvent may comprise n-methyl-2-pyrrolidone xylene and can be employed in various proportions in order to achieve a particular desired viscosity of mixture for coating onto the substrate.

The composite layer may further comprise from 0.5 to 15% vol of a fluoropolymer particulate, and a preferred range of 2 to 8% vol.

A fluoropolymer particulate may be included in the bearing material for its beneficial effect on material frictional properties and its self-lubricating effect. The fluoropolymer particulate addition may preferably be constituted by polytetrafluoroethylene (PTFE), as this is the most effective of the fluoropolymers in terms of reducing the friction coefficient of the bearing material and improving the self-lubricating properties. However, other suitable fluoropolymers, such as fluorinated ethylene-propylene (FEP), may be used if desired.

Below 0.5% vol of the fluoropolymer particulate, the improvement in wear resistance and tribological properties is not significant. Above 15% vol of the fluoropolymer particulate, the structural integrity of the composite layer may be compromised. Too high a content of fluoropolymer particulate reduces the matrix hardness and strength by an unacceptable degree.

Particle size of the fluoropolymer particulate desirably lies in the range from 1 to 5 μm, and a size range of 2 to 3 μm is preferred.

The composite layer may further comprise from 0.5 to less than 15% vol of a metal powder. Advantageously, the metal powder (particularly in the form of metallic flakes) enhances the thermal conductivity of the composite layer. The metal powder may further enhance the wear resistance of the composite layer, in particular providing wear resistance performance that may complement the wear resistance performance of the carbon nanotubes. Below 0.5% vol of the metal powder, the improvement in wear resistance and tribological properties is not significant. Above 15% vol of the metal powder, the structural integrity of the composite layer may be compromised.

In a preferred embodiment of the plastics polymer bearing material of the present invention, the metal powder content may lie in the range from 5 to 15% vol, and more preferably from 11 to 14% vol, with a typical value being 12.5% vol.

The metal powder may be chosen from: aluminium, aluminium alloys, copper, copper alloys, silver, tungsten, stainless steel. We have found that pure aluminium powder on its own gives the best results.

Aluminium powder having particles in the form of flake platelets of about 1 to 5 μm in size, and preferably 2 to 3 μm in size, provides the most suitable form of metal powder addition. The flake nature of the powder generally results in the maximum area of metal powder being exposed to a co-operating shaft journal by virtue of the plane of the flakes orientating generally parallel to the bearing surface. The provision of flakes within the composite layer that are generally parallel to the bearing surface may be provided by spray deposition of the composite layer.

A further advantage of the platelet flake morphology of the aluminium powder is that the particles are more securely bonded to the matrix by virtue of the relatively large surface area of each individual particle, thus resists aluminium particles becoming plucked from the matrix during engine operation.

Without wishing to be bound by any particular theory, it is believed that the alumina film formed on the surface of the aluminium flakes may provide enhanced wear resistance. It is believed that the alumina provides a very fine abrasive, which tends to polish the machining asperities on the co-operating shaft journal surface, rendering the shaft journal surface itself less abrasive to the polymer-based bearing material and thus reducing the wear rate thereof.

The composite layer may further comprise a matrix of a polyimide/amide plastics polymer material and having distributed throughout the matrix: from 0.5 to less than 15% vol of a metal powder; from 0.5 to 15% vol of a fluoropolymer particulate, the balance being the polyimide/amide resin apart from incidental impurities.

The composite layer may further comprise 12.5% vol Al powder, 5.7% vol PTFE particulate, 4.8% vol silane powder, <0.1% vol other components, and balance (approximately 77% vol) polyimide/amide.

The composite layer may further comprise from 0.5 to 10% vol inorganic particulate, and a preferred range of 3 to 5% vol.

The inorganic particulate may be a hard inorganic particulate. The hard inorganic particulate may be selected from the group consisting of TiCN, SiC, NbC, $Si_3N_4$, $Al_2O_3$ (alumina), TiN, B$_4$C, and BN. The inorganic particulate may be talc (hydrated magnesium silicate).

The inorganic particulate may increase the wear resistance of the composite layer.

Alumina appears to have a beneficial effect in that it gently polishes the surface of the cooperating shaft journal to render the journal surface less abrasive to the bearing surface thereby decreasing wear thereof.

Boron nitride may be beneficial, particularly where the particle morphology is in platelet form. Boron nitride of hexagonal crystal structure in platelet form may co-operate with the lubricant to provide enhanced compatibility resulting in better seizure and scuffing resistance.

Talc, whilst being a very soft material, in contrast to boron nitride, for example, appears to reinforce the polymer matrix especially at the edges adjacent the axial bearing ends where some shrinkage may otherwise occur during curing of the polymer, resulting in greater edge wear in use when talc is not present. However, it has also been found that boron nitride also fulfils this function of minimising shrinkage and wear effects at bearing edges.

The substrate may comprise a strong backing material layer and the composite layer may be provided on the backing material layer. The strong backing material may be steel, copper-based (e.g. bronze-based alloy) or aluminium-based.

The substrate may comprise a strong backing material layer and a metallic bearing material layer and the composite layer may be provided on the metallic bearing material layer. The metallic bearing material layer may be an aluminium-based or copper-based bearing alloy.

In the case where only a strong backing layer is used without an intervening metallic bearing lining material layer, the composite layer may be deposited in a thicker layer than in the case where it is deposited upon a metallic bearing material layer.

The bearing lining layer may comprise a lead free Cu-based alloy (a Cu-based alloy having no more than 20% wt additive elements, with the balance to 100% wt of Cu, e.g. 8% wt Sn, 1% wt Ni, and Cu remaining balance), and has a thickness in the region of 300 µm (e.g. 200 to 400 µm).

Alternatively, the bearing lining layer may comprise a lead free Al-based alloy (an Al-based alloy having no more than 25% wt additive elements, with the balance to 100% wt of Al, e.g. 6.5% wt Sn, 1% wt Cu, 1% wt Ni, 2.5% wt Si, <2% wt Mn, <2% wt V, and Al remaining balance), and has a thickness in the region of 300 µm (e.g. 200 to 400 µm).

The bearing lining layer may be provided onto the backing by a known method that is not by a sputter deposition coating process, such as: (i) sintering a powder onto the backing in a high temperature furnace (typically accompanied by a mechanical rolling step); (ii) by a roll-bonding process (typically followed by a heat treatment step) during a thermo-mechanical working process; or (iii) by a casting process in which molten metal is spread onto the backing and quenched. The sintering and casting processes are typically used with Cu-based lining layers and the roll-bonding process is typically used with Al-based lining layers. Typically, the blanks for individual bearings are cropped from a coil comprising the backing layer with the Cu- or Al-based lining layer formed thereon. The blanks are then shaped to form half-cylinders or other appropriate shapes, and then typically de-greased before deposition of any interlayer and the polymer-based overlay coating. However, it will be appreciated that the manufacturing steps may be undertaken in other appropriate orders.

The substrate may be in the form of a substantially finished semi-cylindrical half bearing shell or a flat strip from which bearings may then be formed after the coating step, for example. The substrate may be in the form of a substantially semi-annular thrust flange or a tubular bushing. The substrate may be a connecting rod or a shaft configured for journaling in a bearing. The substrate may be a bearing block or a bearing cap (i.e. engine block or engine cap or ladder frame configured to receive a journaled shaft without an intervening bearing shell or tubular bushing).

Adhesion of the composite layer onto the bearing lining layer may be enhanced by grit-blasting the lining layer prior to deposition of the composite layer. Alternatively, an adhesion enhancing interlayer may be provided, e.g. the substrate may comprise a non-sputter coated metallic base layer (e.g. the strong backing layer or metallic bearing material layer) and the composite layer may be bonded to the non-sputter coated metallic base layer by a sputter-coated Al-based intermediate layer. The sputter-coated Al-based intermediate layer may have a thickness of less than 20 µm.

The composite layer may have a thickness of less than 100 µm, and preferably from 4 to 40 µm, more preferred from 4 to 15 µm, and yet more preferred from 6 to 12 µm. Thinner composite layers will be worn through before the end of engine life, and thicker composite layers have a lower fatigue resistance.

The sliding bearing may be a half bearing shell, a thrust washer, or a bearing bush.

Note that in the described compositions the proportions (i.e. % vol and % wt) of polymer, carbon nanostructures and any other components of the composite layer are those remaining in the final material after the solvent has been removed.

The method of coating may be selected from the group consisting of spraying and printing (e.g. screen printing or pad printing).

The mixture of plastics polymer-based resin material and carbon nanostructures may further comprise solvent, and the method may comprise the step of treating the sliding bearing to remove the solvent after the mixture has been coated onto the substrate In the case of spraying, control of layer thickness may also be exercised by spraying a plurality of separate layers onto the substrate.

BRIEF DESCRIPTION OF THE DRAWINGS

Embodiments of the invention are further described hereinafter with reference to the accompanying drawings, in which.

DETAILED DESCRIPTION

In the described embodiments, like features have been identified with like numerals, albeit in some cases having suffix letters. For example, in different figures, 6A, 6B and 6C have been used to indicated carbon nanotubes.

Figure 1:
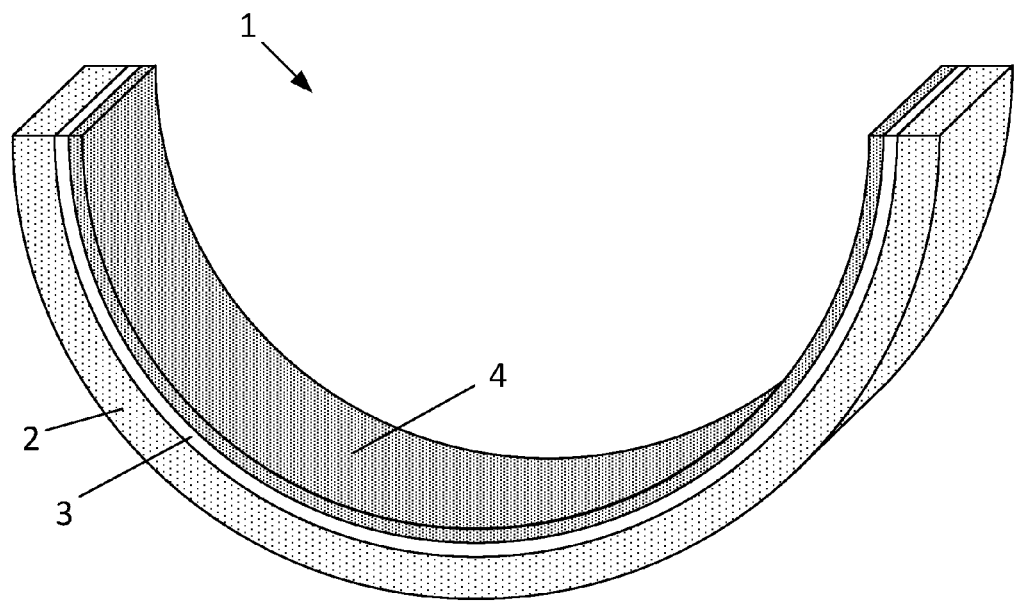
FIG. 1 shows a schematic perspective view of a bearing shell.

FIG. 1 schematically illustrates a sliding bearing 1 in the form of a hollow semi-cylindrical bearing lining shell (commonly referred to as a "half bearing"). The half bearing 1 comprises a strong steel backing 2, a copper-based bearing lining layer 3 within the backing, and a plastics polymer-based bearing material composite "overlay" layer 4 comprising carbon nanotubes that is provided directly onto the bearing lining layer.

The adhesion of the composite overlay layer 4 may be enhanced by the application of a surface preparation technique to the surface of the bearing lining layer 3, such as grit-blasting, prior to deposition of the composite overlay layer. Alternatively, an additional aluminium-based sputtered layer (not shown) may be provided directly onto the lining layer 3, before the composite "overlay" layer 4.

An overlay layer is an exposed layer of a sliding bearing element, configured to provide a running surface over the life of the sliding bearing (e.g. over engine-life), in contrast to a less robust running-in layer for short-term use at the start of life. The overlay layer is configured to face a moving element in a bearing assembly (e.g. the overlay layer receives a journaled crankshaft in an assembled bearing, which mutually cooperate, with an intervening oil film). For example, for a bearing shell, the overlay layer is the innermost layer facing towards a journaled shaft, such as a crankshaft.

The composite overlay layer 4 comprises a matrix of plastics polymer-based composite material having distributed throughout the matrix: 0.1 to 5% vol carbon nanotubes, 12.5% vol Al powder, 5.7% vol PTFE particulate, 4.8% vol silane powder, <0.1% vol other components, and balance (approximately 77% vol) polyimide/amide plastics polymer, apart from incidental impurities.

The polyimide/amide based material is applied as a mixture with a solvent. A suitable solvent may comprise n-methyl-2-pyrrolidone xylene and can be employed in various proportions in order to achieve a particular desired viscosity of mixture suitable for coating onto the substrate. Note that the specification, above, of the composition of the plastics polymer-based bearing material overlay layer 4 is that which remains in the final material after the solvent has been removed.

A mixture is formed with the polyimide/amide in the solvent, the carbon nanostructures and other components. The mixture may be agitated to maintain the components in suspension, prior to coating the bearing substrate. The composite overlay layer 4 is built up by a spray coating process in which repeated deposition of thin spray coatings is interspersed with flash off phases to remove solvent. After the final coating deposition step, the sliding bearing is given a final cure at 150 to 250° C. for about 30 minutes, to consolidate the plastic polymer-based matrix.

Alternatively, the plastics polymer-based composite bearing material layer 4 could be deposited by a screen printing (i.e. through a mask) or a pad printing process (i.e. an indirect offset printing process, e.g. in which a silicone pad transfers a patterned layer of the plastics polymer composite material onto the sliding bearing substrate).

Desirably the solvent mixture is of a suitable viscosity that the coating technique of applying the solvent mixture to the substrate results in the final thickness of the plastics polymer bearing material being at a desired thickness without the need to machine to a desired final wall, thickness. However, machining of the plastic polymer material may be undertaken if required.

In the alternative case that an interlayer is additionally provided, the interlayer is deposited by a sputter coating process, has a thickness of 2 to 3 μm, and is strongly adhered to the bearing lining layer 3. The interlayer comprises 1.5% wt Mn with the remaining balance to 100% wt of Al, apart from incidental impurities. (In alternatives: the interlayer may comprise 6% wt Sn, 1% Cu, 1% wt Ni, and 2% wt Si, with the balance to 100% wt being Al apart from incidental impurities; or the interlayer may comprises pure Al, apart from incidental impurities.)

Figure 2A:
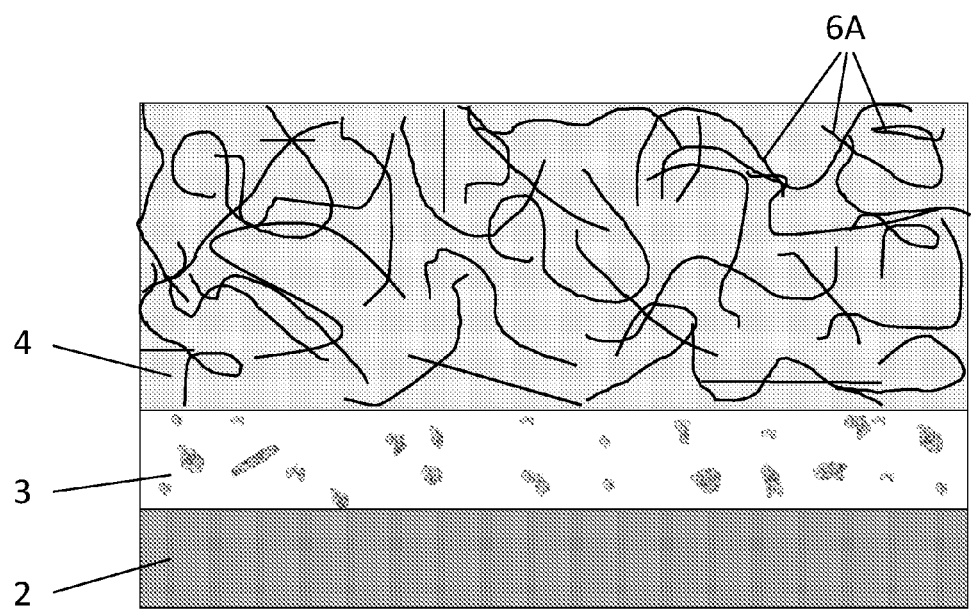
FIGS. 2A, 2B and 2C show schematic cross-sectional views through parts of a bearing shell that is similar to that of FIG. 1.
Figure 2B:
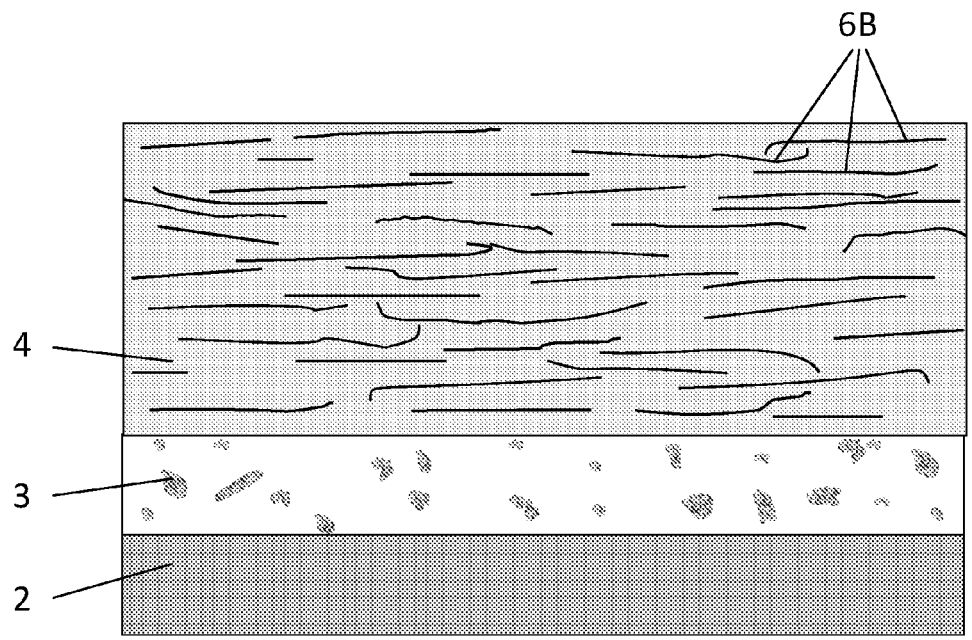
Figure 2C:
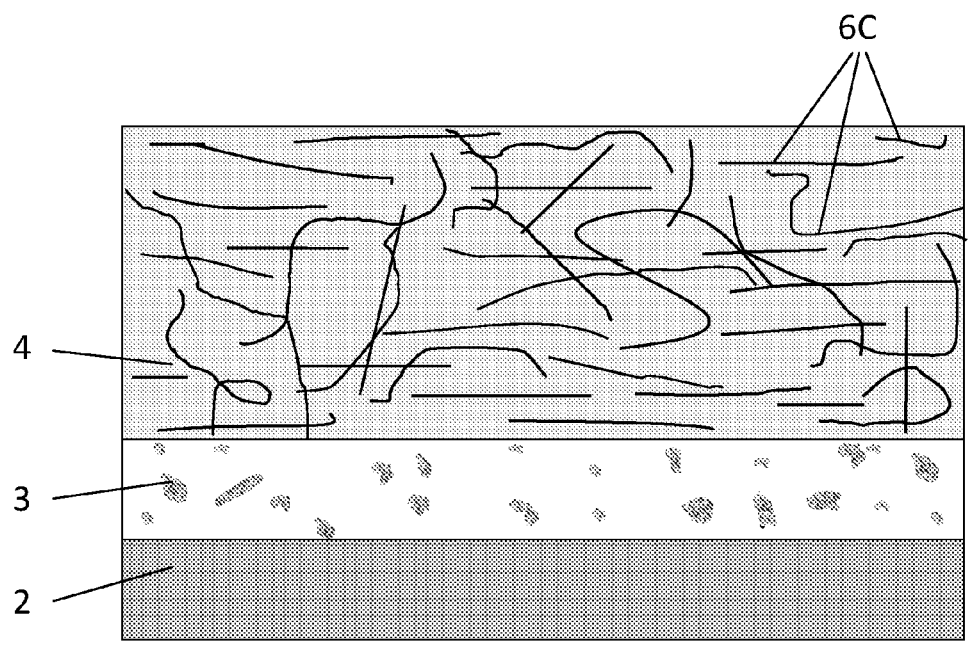

FIGS. 2A, 2B and 2C illustrate arrangements of the carbon nanotubes 6A incorporated into the polyimide/amide of the composite overlay layer 4, of a sliding bearing that is similar to that of FIG. 1, but without the interlayer 5.

In FIG. 2A the carbon nanotubes 6A are incorporated into the polyimide/amide of the composite overlay layer 4 in a randomly aligned arrangement. A sufficient density and uniformity of distribution of the carbon nanotubes 6A is provided such that a high level of entanglement of the carbon nanotubes results, providing an overlay layer 4 having a high level of fatigue resistance.

In FIG. 2B the carbon nanotubes 6B are incorporated into the polyimide/amide of the composite overlay layer 4 in a highly aligned arrangement, with the length of the nanotubes substantially parallel to the interface between the composite layer 4 and the bearing lining layer 3. In this arrangement, the exposed sides of nanotubes 6B at the surface provide a composite layer with enhanced lubricious properties.

In FIG. 2C the carbon nanotubes 6C are incorporated into the polyimide/amide of the composite overlay layer 4 in a partially aligned arrangement, being partially aligned with the interface between the composite layer 4 and the bearing lining layer 3. In this arrangement, the nanotubes 6C provide an advantageous compromise between the properties of a high level of fatigue resistance and being highly lubricious.

The figures provided herein are schematic and not to scale.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A sliding bearing for an internal combustion engine, comprising:
   a plastics polymer-based composite layer on a substrate, the composite layer including:
   a matrix of plastics polymer-based material having distributed throughout the matrix:
   0.1 to 5% vol carbon nanostructures; and
   incidental impurities;
   wherein the carbon nanostructures are functionalised carbon nanostructures, wherein the functionalised carbon nanostructures have a structural unit including one or more of an acid side chain, an acyl side chain, an amine/amide side chain, a fluorinated side chain, and an oxidised side chain; and
   wherein the matrix of plastics polymer-based material is a polyimide/amide resin.

2. The sliding bearing according to claim 1, wherein the carbon nanostructures comprise carbon nanotubes.

3. The sliding bearing according to claim 2, wherein the carbon nanotubes are 0.5 to 50 nm in diameter.

4. The sliding bearing according to claim 3, wherein the nanotubes are at least 100 times longer than their diameter.

5. The sliding bearing according to claim 2, wherein the nanotubes are 1 to 40 µm long.

6. The sliding bearing according to claim 1, wherein the carbon nanostructures comprise ball-shaped carbon nanostructures.

7. The sliding bearing according to claim 1, wherein the carbon nanostructures comprise ellipsoidal carbon nanostructures.

8. The sliding bearing according to claim 1, wherein the matrix has 0.5 to 3% vol carbon nanostructures.

9. The sliding bearing according to claim 1, wherein the composite layer further includes from 0.5 to 15% vol of a fluoropolymer particulate.

10. The sliding bearing according to claim 1, wherein the composite layer further includes a metal powder composition of 0.5 to less than 15% vol.

11. The sliding bearing according to claim 1, wherein the matrix of the polyimide/amide resin includes distributed throughout the matrix: from 0.5 to less than 15% vol of a metal powder; from 0.5 to 15% vol of a fluoropolymer particulate, the balance being polyimide/amide resin apart from incidental impurities.

12. The sliding bearing according to claim 11, wherein the matrix includes 12.5% vol of Al powder, 5.7% vol of PTFE particulate, 4.8% vol of silane powder, <0.1% vol other components, and a balance of polyimide/amide.

13. The sliding bearing according to claim 1, wherein the composite layer includes 0.5 to 10% vol of inorganic particulate.

14. The sliding bearing according to claim 13, wherein the particulate is selected from the group consisting of: TiCN, SiC, NbC, $Si_3N_4$, $Al_2O_3$, TiN, $B_4C$, BN and talc.

15. The sliding bearing according to claim 1, wherein the substrate comprises a backing material layer and the composite layer is provided on the backing material layer.

16. The sliding bearing according to claim 1, wherein the substrate comprises a steel, copper-based or aluminum-based backing material layer and a metallic bearing material layer and the composite layer is provided on the metallic bearing material layer.

17. The sliding bearing according to claim 1, wherein the substrate comprises a non-sputter coated metallic base layer and the composite layer is bonded to the non-sputter coated metallic base layer by a sputter-coated Al-based intermediate layer.

18. The sliding bearing according to claim 1, wherein the composite layer has a thickness of 6 to 12 µm.

19. The sliding bearing according to claim 1, wherein the sliding bearing is at least one of a half bearing shell, a thrust washer and a bearing bush.

20. A flat sheet element for forming a sliding bearing for an internal combustion engine according to claim 1.

21. A method of manufacturing a sliding bearing for an internal combustion engine having a plastics polymer-based composite layer on a substrate, the composite layer including:
    a matrix of plastics polymer-based material having distributed throughout the matrix:
    0.1 to 5% vol carbon nanostructures; and
    incidental impurities,
    the method comprising the steps of:
    making a mixture including a plastics polymer-based resin material and carbon nanostructures, wherein the plastics polymer-based resin material includes a polyimide/amide resin and the carbon nanostructures are functionalised carbon nanostructures;
    coating the mixture onto a substrate; and
    treating the mixture so as to consolidate the plastics polymer-based resin material to form the composite layer;
    wherein the functionalised carbon nanostructures have a structural unit selected from at least the following group: an acid side chain, an acyl side chain, an amine/amide side chain, a fluorinated side chain, and an oxidised side chain.

22. The method according to claim 21, wherein
    the mixture of plastics polymer-based resin material and carbon nanostructures includes a solvent, and
    wherein treating the mixture includes heating the mixture to a predetermined temperature for a predetermined duration.

23. The method according to claim 21, wherein the step of coating includes at least one of spraying and printing.

24. The method according to claim 21, wherein:
    the mixture of plastics polymer-based resin material and carbon nanostructures further includes a concentration of 0.5 to less than 15% vol of a metal powder, 0.5 to 15% vol of a fluoropolymer particulate, and 3 to 6% vol of a silane material, the balancing being the polyimide/amide resin apart from incidental impurities.

* * * * *

UNITED STATES PATENT AND TRADEMARK OFFICE
CERTIFICATE OF CORRECTION

PATENT NO. : 9,562,565 B2  
APPLICATION NO. : 14/400250  
DATED : February 7, 2017  
INVENTOR(S) : Roohollah Kachoosangi It is certified that error appears in the above-identified patent and that said Letters Patent is hereby corrected as shown below:

On the Title Page

Item [71] Applicants, delete "MAHLE ENGINE SYSTEMS US LIMITED" and insert --MAHLE ENGINE SYSTEMS UK LIMITED--.

Signed and Sealed this  
Sixth Day of March, 2018

Andrei Iancu  
*Director of the United States Patent and Trademark Office*